UNITED STATES PATENT OFFICE.

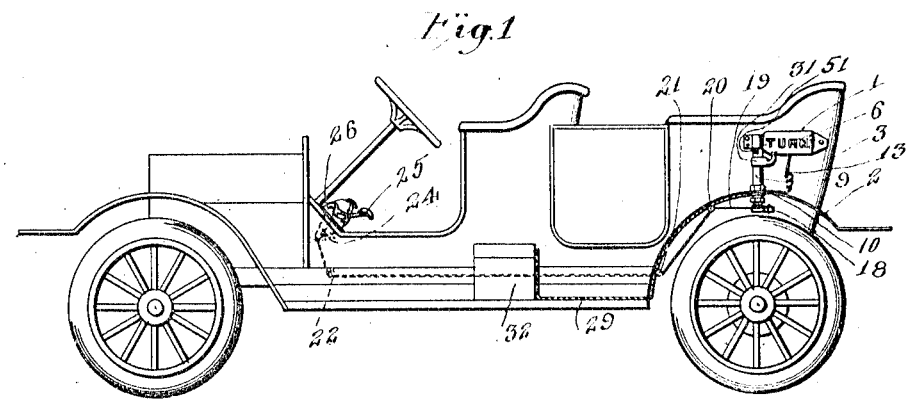
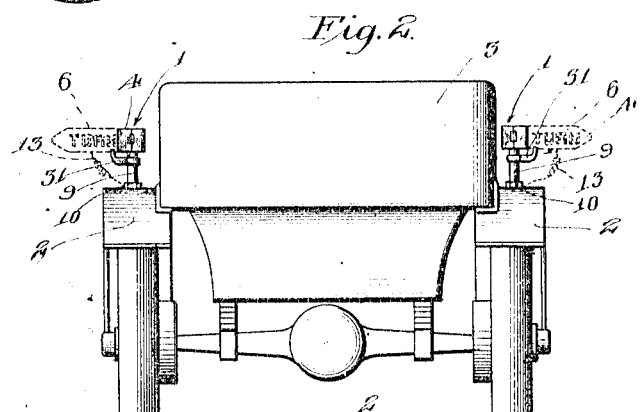
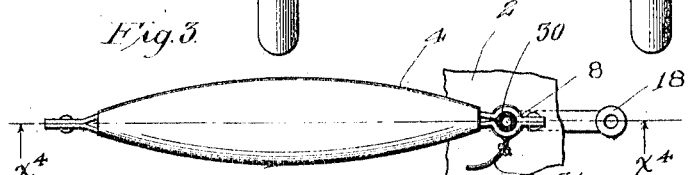
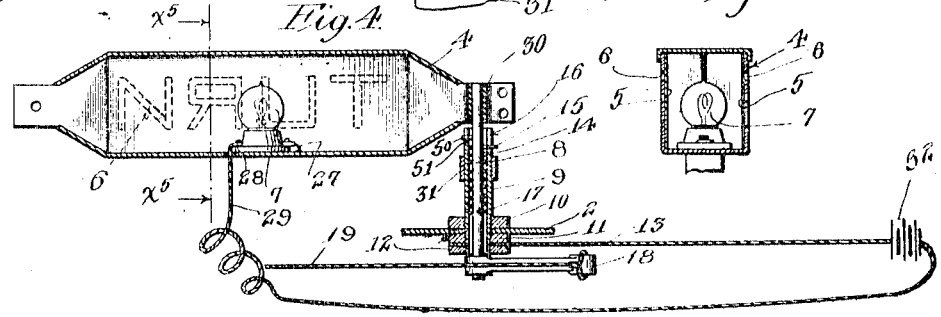

JOSEPH B. HAWKS AND HOMER R. KENNEDY, OF LOS ANGELES, CALIFORNIA.

VEHICLE-SIGNAL.

1,090,302.

Specification of Letters Patent. Patented Mar. 17, 1914.

Application filed July 17, 1912. Serial No. 710,072.

*To all whom it may concern:*

Be it known that we, JOSEPH B. HAWKS and HOMER R. KENNEDY, citizens of the United States, residing at Los Angeles, in the county of Los Angeles and State of California, have invented a new and useful Vehicle-Signal, of which the following is a specification.

This invention relates to a signal adapted to be placed on a vehicle and operated by the driver or other person aboard the vehicle, to indicate to others when the vehicle is about to turn and thereby warn operators of other vehicles or people of danger, and thus prevent accidents.

The device is particularly adapted for application to automobiles, although not restricted to such vehicles.

Referring to the drawings: Figure 1 is a side elevation of an automobile equipped with the invention. Fig. 2 is a rear view of the automobile, dotted lines showing warning position of the signals. Fig. 3 is an enlarged plan view of a semaphore. Fig. 4 is a sectional view on line $x^4$—$x^4$, Fig. 3. Fig. 5 is a section through a semaphore on line $x^5$—$x^5$, Fig. 4.

The device comprises an illuminated signal 1, pivotally supported upon the guard 2 of the automobile 3. The signal comprises a hollow semaphore 4, with transparent side panels 5 one in each side thereof, the panels 5 preferably being colored. Outside of the panels 5 are stencil plates 6, each displaying a warning such, for example, as the word "turn." Within the semaphore 4 is an electric light 7.

The inner end of the semaphore 4 is mounted on a vertical shaft 8 as shown in Fig. 4, the latter being revolubly supported in a vertical tube 9, the tube 9 being screwed into a nut 10 which rests on the guard 2, and a nut 11 screwed on the tube 9 bears against the underside of the guard and firmly holds the tube in position. A nut 12 secures one wire 13 of the circuit and grounds the wire 13 to the metallic portions of the device. The shaft 8 is of slightly less diameter than the tube 9 and a coil torsion spring 14 encircles shaft 8 within the tube 9, the upper end 15 of the spring 14 projecting through a slot 16 in the tube 9, and the lower end 17 of the spring engaging in the shaft 8. On the lower end of the shaft 8 is an arm 18 to the free end of which is attached a cable 19, which extends over suitable pulleys 20, 21 and 22 to an arm 24 which is operated by a pedal 25, so that by pushing down on pedal 25, arm 24 will be rocked forward to pull the cable 19 and turn the semaphore 4 into a position at right angles to the vehicle as indicated in dotted lines in Fig. 2, thereby displaying the warning signals visible from the front or rear of the vehicle. A foot operated pawl 26 serves to hold the pedal 25 in the position set, and when it is desired that the signal arm return to normal position, the pawl 26 is operated to release pedal 25, whereupon spring 14 restores semaphore 4 to normal position, folded back parallel to the body of the machine. A pin 50 working in a 90° slot 51 limits the return movement of the shaft 8 and through it the return movement of the semaphore.

One terminal 27 of the lamp is grounded as shown in Fig. 4, on the metal of the semaphore 4. The other terminal 28 is connected with wire 29, the latter being insulated from the semaphore and forming the other side of the circuit. The semaphore 4 is insulated from the shaft 18 by insulation 30, and, therefore, normally is not in electrical connection with wire 13. A stationary contact arm 31, shown clearly in Figs. 1 and 2, is secured to the tube 9 and projects laterally therefrom, and when the semaphore swings into signaling position, as shown in dotted lines in Fig. 2, the metal portion of the semaphore strikes the arm 31 and thus completes electrical connection with the metallic parts which are in connection with wire 13, thereby establishing circuit through the lamp and illuminating the semaphore, causing the words "turn" to be clearly visible. The wires 13 and 29 are respectively connected with a battery 32. Thus if the person driving the vehicle intends to turn to the left, he will operate the left-hand system of connections which will swing the left-hand semaphore into signaling position and indicate that he is about to turn to the left, and after he has turned to the left, he releases the signal, permitting it to return to normal position. If he intends to turn to the right, he operates the signal on the right-hand side instead of the left-hand side, in like manner.

What we claim is:

A vehicle signal comprising a vertical tube, upper and lower nuts, a shaft, mounted in the tube, having an arm secured to its lower end, a spring surrounding the shaft and having its ends secured to the tube and shaft respectively, a pedal having an arm, a flexible connection between said arm of the shaft and said arm of the pedal, a contact arm secured to the tube, a semaphore of conducting material secured to the upper end of the shaft and adapted to contact with said contact arm, an electric lamp within the semaphore, having terminals, one of which is electrically connected to the semaphore, a battery, a wire connected at one end with the battery and at the other end to the lower nut, and a second wire connected at one end to the battery and at the other end to the other terminal of the lamp.

In testimony whereof, we have hereunto set our hands at Los Angeles, California this 11th day of July, 1912.

JOSEPH B. HAWKS.
HOMER R. KENNEDY.

In presence of—
GEO. T. HACKLEY,
MARTHA M. LANGE.